United States Patent
Gogic

(10) Patent No.: US 7,751,825 B2
(45) Date of Patent: Jul. 6, 2010

(54) CONTROLLING GEOGRAPHIC LOCATION INFORMATION OF DEVICES OPERATING IN WIRELESS COMMUNICATION SYSTEMS

(75) Inventor: Aleksandar M. Gogic, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 360 days.

(21) Appl. No.: 10/185,783

(22) Filed: Jun. 27, 2002

(65) Prior Publication Data

US 2004/0002814 A1    Jan. 1, 2004

(51) Int. Cl.
*H04Q 7/20* (2006.01)

(52) U.S. Cl. ............. 455/456.1; 455/456.3; 455/457; 455/404.2

(58) Field of Classification Search ... 455/456.1–456.3, 455/404.2, 214, 213, 301, 4; 701/214, 200–213, 701/301, 4; 342/357.06, 357.08, 450
See application file for complete search history.

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,365,451 A | | 11/1994 | Wang et al. |
| 5,450,329 A | * | 9/1995 | Tanner ............... 701/213 |
| 5,933,777 A | | 8/1999 | Rahman |
| 6,026,305 A | * | 2/2000 | Salinger et al. ......... 455/456.3 |
| 6,091,956 A | | 7/2000 | Hollenberg |
| 6,167,276 A | * | 12/2000 | Pite ............. 455/456.3 |
| 6,240,425 B1 | * | 5/2001 | Naughton ........... 707/104.1 |
| 6,246,361 B1 | * | 6/2001 | Weill et al. ........ 342/357.01 |
| 6,353,412 B1 | | 3/2002 | Soliman |
| 6,748,224 B1 | * | 6/2004 | Chen et al. ........... 455/456.1 |
| 6,847,823 B2 | | 1/2005 | Lehikoimen et al. |
| 6,907,269 B2 | | 6/2005 | Yamaguchi et al. |
| 7,403,905 B2 | | 7/2008 | Shioda et al. |
| 2001/0055975 A1 | | 12/2001 | McDonnell et al. |
| 2002/0077127 A1 | | 6/2002 | Heckard et al. |
| 2002/0090957 A1 | * | 7/2002 | Harris ............ 455/456 |
| 2002/0115445 A1 | * | 8/2002 | Myllymaki ........... 455/456 |
| 2003/0016147 A1 | * | 1/2003 | Evans ............ 340/988 |
| 2003/0083080 A1 | * | 5/2003 | Fournier et al. ........ 455/466 |

FOREIGN PATENT DOCUMENTS

CA    2368279    10/2000

(Continued)

OTHER PUBLICATIONS

International Search Report - PCT/US03/20386 - International Search Authority - European Patent Office - Feb. 12, 2004.

(Continued)

*Primary Examiner*—Patrick N Edouard
*Assistant Examiner*—Dai A Phuong
(74) *Attorney, Agent, or Firm*—Kyong H. Macek; Linda G. Gunderson

(57) ABSTRACT

Methods and apparatus are presented herein for controlling the degree of precision with which geographic information is reported to a requesting entity. A precise geographic location is used to determine an adjusted geographic location, which is then transmitted to the requesting entity rather than the precise geographic location.

17 Claims, 3 Drawing Sheets

FOREIGN PATENT DOCUMENTS

| | | |
|---|---|---|
| CA | 2572610 | 12/2005 |
| EP | 1 113 678 A2 | 7/2001 |
| EP | 1 156 695 A2 | 11/2001 |
| TW | 469720 | 12/2001 |
| TW | 264230 | 10/2006 |
| WO | 01/63960 A1 | 8/2001 |
| WO | 02/32100 A1 | 4/2002 |

OTHER PUBLICATIONS

International Preliminary Examination Report - PCT/US03/20386 - IPEA/US - Alexandria, Virginia - Feb. 3, 2006.

* cited by examiner

CONTROLLING GEOGRAPHIC LOCATION INFORMATION OF DEVICES OPERATING IN WIRELESS COMMUNICATION SYSTEMS

BACKGROUND

1. Field

The present invention relates generally to communication and/or information systems, and more specifically, to providing location privacy safeguards to users operating devices within said systems.

2. Background

In June of 1996, the Federal Communications Commission (FCC) issued an Enhanced Emergency 911 (E911) mandate that requires wireless communication systems to implement position locationing services. The position locationing services are for locating a mobile station within the range of 50 meters, so that if the user of a mobile station places a 911 call for emergency services, help can be directed to the user in a timely and accurate manner.

Due to E911, many service providers of wireless communication systems developed position locationing services, some with the ability to locate a mobile station within an extremely narrow range of accuracy. For example, in the code division multiple access (CDMA) systems, a location of an operating mobile station can be determined within the range of mere inches under optimal conditions.

With the development of systems that can pinpoint the location of a mobile station with "pinpoint" accuracy, commercial applications can follow. It is envisioned that commercial services will be offered to mobile station users by the service providers themselves or by external entities via access to the Internet. One example of a commercial service that can use the position of a mobile station is navigation assistance services.

However, commercial services cannot be implemented until privacy concerns are addressed. It is probable that some users of the wireless communication system would strenuously object to having knowledge of their precise whereabouts known to other parties. Until the privacy concerns of individuals are adequately addressed, position-dependent commercial services should not be offered.

The embodiments described herein allow service providers or any other party to offer position-dependent services without sacrificing an individual's rights to privacy. Moreover, means are provided by which the exchange of location information between a mobile station and another party can be facilitated in an economical manner, which would accelerate the proliferation of these services.

SUMMARY

Methods and apparatus are presented herein to address the needs addressed above. In one aspect, an apparatus is presented for controlling geographic location information of a target, the apparatus comprising: a memory element; and a processing element configured to execute a set of instructions stored in the memory element, the set of instructions for: determining a precise location of the target; using the precise location to determine an adjusted location of the target; and transmitting the adjusted location of the target to a requesting entity.

In another aspect, a method is presented for diluting precise location information of a target device, the method comprising: converting a measured latitude arc value of the precise location into a linear distance; rounding the linear distance with a predetermined linear precision to an adjusted linear distance value; converting the adjusted linear distance value into an adjusted latitude arc value; determining a measured longitude linear distance corresponding to the adjusted latitude arc value; rounding the measured longitude linear distance within a second predetermined linear precision to an adjusted measured longitude linear distance; converting the adjusted measured longitude linear distance to an adjusted longitude arc value; and transmitting the adjusted latitude arc value and the adjusted longitude arc value to a requesting entity.

In another aspect, a method is presented for determining when to transmit a target location to a requesting entity, the method comprising: determining whether a first threshold value associated with a distance-based reporting scheme has been crossed; determining whether a second threshold value associated with a waypoint-based reporting scheme has been crossed; determining whether a third threshold value associated with a proximity-based reporting scheme has been crossed; determining whether a fourth threshold value associated with a speed-based reporting scheme has been crossed; and if the first threshold value, the second threshold value, the third threshold value, or the fourth threshold value has been crossed, then transmitting the target location to the requesting entity.

DETAILED DESCRIPTION

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses systems using either cellular or personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

Figure 1:
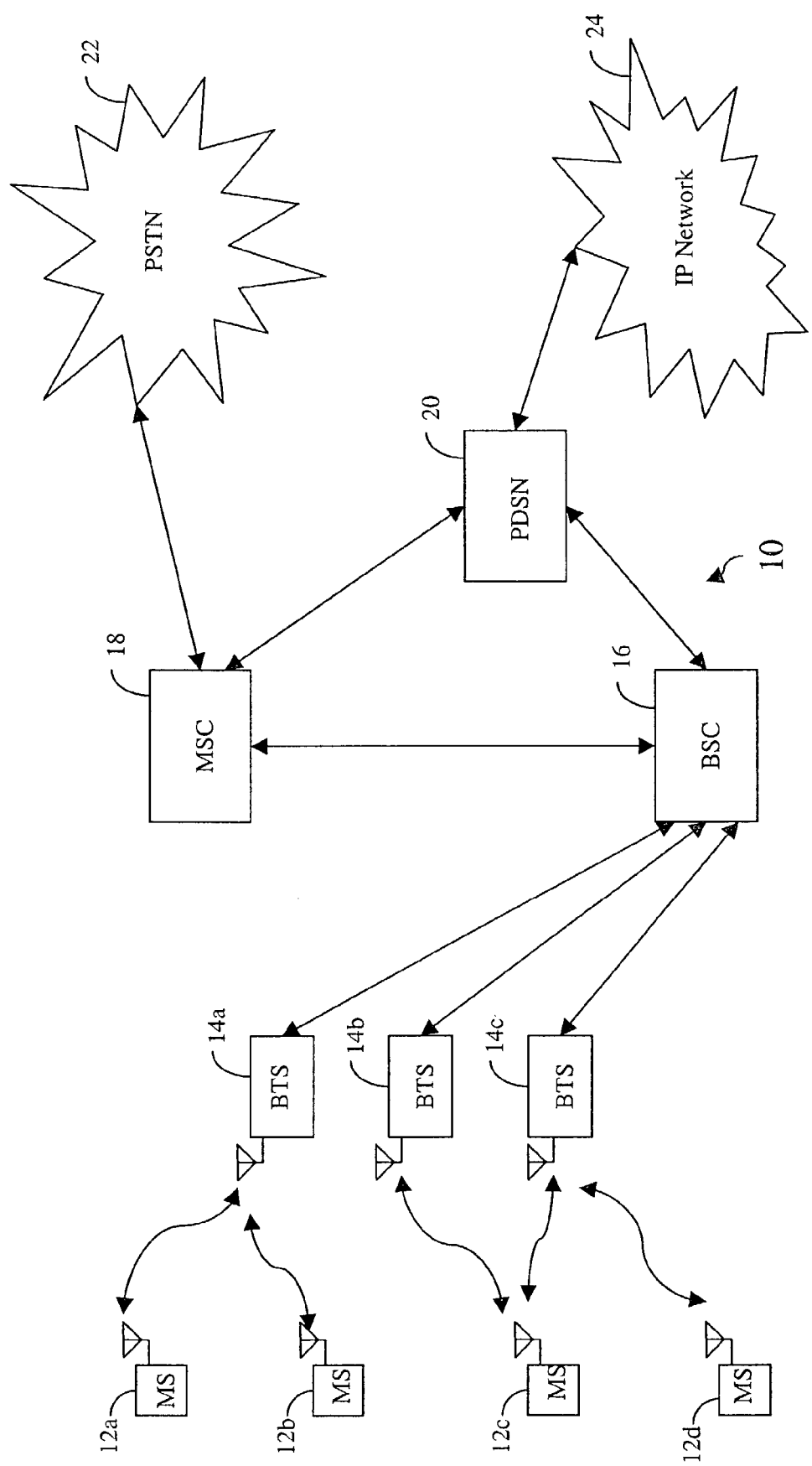
FIG. 1 is a block diagram of a wireless communication network.

As illustrated in FIG. 1, a wireless communication network 10 generally includes a plurality of mobile stations (also called subscriber units or remote stations or user equipment) 12a-12d, a plurality of base stations (also called base station transceivers (BTSs) or Node B). 14a-14c, a base station controller (BSC) (also called radio network controller or packet control function 16), a mobile switching center (MSC) or switch 18, a packet data serving node (PDSN) (also called general packet radio serving node) or internetworking function (IWF) 20, a public switched telephone network (PSTN) 22 (typically a telephone company), and an Internet Protocol (IP) network 24 (typically the Internet). For purposes of simplicity, four mobile stations 12a-12d, three base stations 14a-14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment, the wireless communication network 10 is a packet data services network. The mobile stations 12a-12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a-12d may be configured to perform one or more wireless packet data protocols such as described in, for example, the EIA/TIA/IS-707 standard. In a particular embodiment, the mobile stations 12a-12d generate IP packets destined for the IP network 24 and encapsulate the IP packets into frames using a point-to-point protocol (PPP).

In one embodiment, the IP network 24 is coupled to the PDSN 20, the PDSN 20 is coupled to the MSC 18, the MSC is coupled to the BSC 16 and the PSTN 22, and the BSC 16 is coupled to the base stations 14a-14c via wirelines configured for transmission of voice and/or data packets in accordance with any of several known protocols, including, e.g., E1, T1, Asynchronous Transfer Mode (ATM), Internet Protocol (IP), Point-to-Point Protocol (PPP), Frame Relay, High-bit-rate Digital Subscriber Line (HDSL), Asymmetric Digital Subscriber Line (ADSL), or other generic digital subscriber line equipment and services (xDSL). In an alternate embodiment, the BSC 16 is coupled directly to the PDSN 20, and the MSC 18 is not coupled to the PDSN 20.

During typical operation of the wireless communication network 10, the base stations 14a-14c receive and demodulate sets of reverse link signals from various mobile stations 12a-12d engaged in telephone calls, Web browsing, or other data communications. Each reverse link signal received by a given base station 14a-14c is processed within that base station 14a-14c. Each base station 14a-14c may communicate with a plurality of mobile stations 12a-12d by modulating and transmitting sets of forward link signals to the mobile stations 12a-12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality, including the orchestration of soft handoffs of a call for a particular mobile station 12a-12d from one base station 14a-14c to another base station 14a-14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

Figure 2:
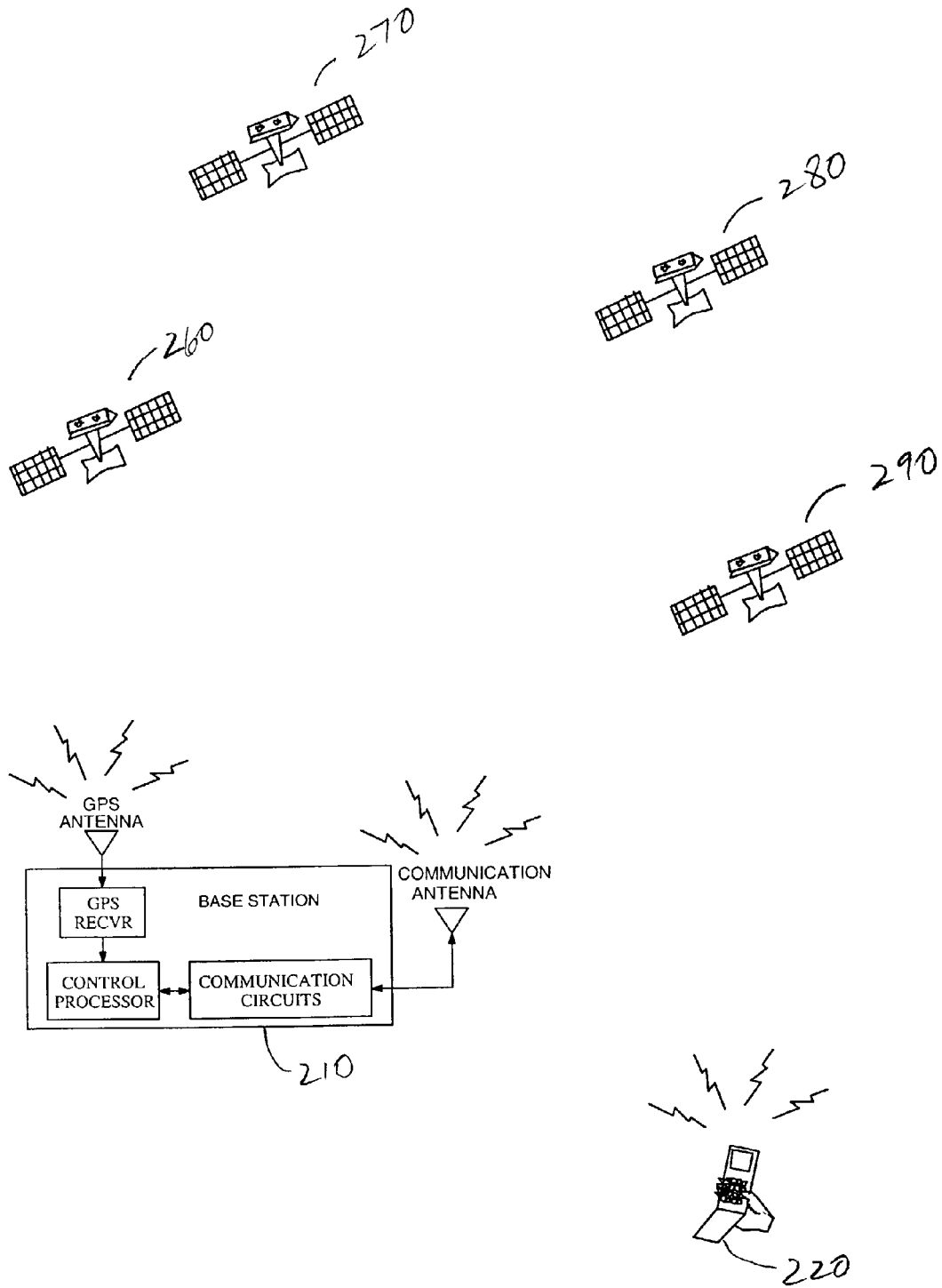
FIG. 2 is a block diagram of a wireless communication network communicatively coupled a GPS satellite system.

FIG. 2 is a diagram showing a system for determining the location of a mobile station in a wireless communication network using Global Positioning System (GPS) satellites. A base station 210 and a mobile station 220 are disposed in a GPS environment having several GPS satellites, of which four are shown 260, 270, 280, and 290. Such GPS environments are well known. See for example Hofmann-Wellenhof, B., et al., GPS Theory and Practice, Second Edition, New York, N.Y.: Springer-Verlag Wien, 1993.

In a typical GPS environment, at least four satellites are required in order for a GPS receiver to determine its position. However, in a CDMA system, only three GPS satellites are needed if the round trip delay between the mobile station 220 and an external signal source, such as the serving base station 210, and the known location of the serving base station 210 are provided. In cases where there is a direct line-of-sight available, only two GPS satellites, round trip delay, and the known location of the external signal source are required to locate a mobile station 220. The number can be reduced even further by using the time difference of arrival information from the forward link of a CDMA system or from any other synchronous cellular communication system. Further details are described in U.S. Pat. No. 6,353,412, entitled "METHOD AND APPARATUS FOR DETERMINING THE POSITION LOCATION USING REDUCED NUMBER OF GPS SATELLITES AND SYNCHRONIZED AND UNSYNCHRONIZED BASE STATIONS," assigned to the assignee of the present invention and incorporated by reference herein.

Using the various systems described above, a party operating from an Internet site or dial-up service could send a location request to a mobile station, or receive position-dependent information from a mobile station. The problem that arises is how a mobile station, whose location is sought by a requesting entity, can control the disclosure of geographic location information so that the privacy of the mobile station user is protected and sufficient information is provided to the requesting entity. For illustrative ease, the term "requesting entity" is used generically to encompass service providers or any other party requesting the location of a mobile station for non-emergency services. Moreover, the term "requesting entity" can be applied to local applications residing within a mobile station that can be used to convey location information to an external party. The mobile station whose geographic position is sought by a requesting entity is referred to herein as a "target."

Another issue is how to support location requests from requesting entities without unduly affecting the load on the forward and reverse links. In communication systems, system resources are consumed whenever transmissions are exchanged between the mobile stations and the base stations. If transmissions are unnecessary, as in the instance when the mobile station is stationary and the same location information is repetitively transmitted, then an unnecessary and undesirable load upon system resources occurs.

The embodiments described below help alleviate the problems described above by controlling the precision of location information in a real-time manner that is commensurate with the use of such location information. In one embodiment, a precision control algorithm uses the real-time, measured location of a target to determine an area of diluted precision, in which the measured location resides. The diluted precision information is then reported to a requesting entity rather than the measured location information.

Figure 3:
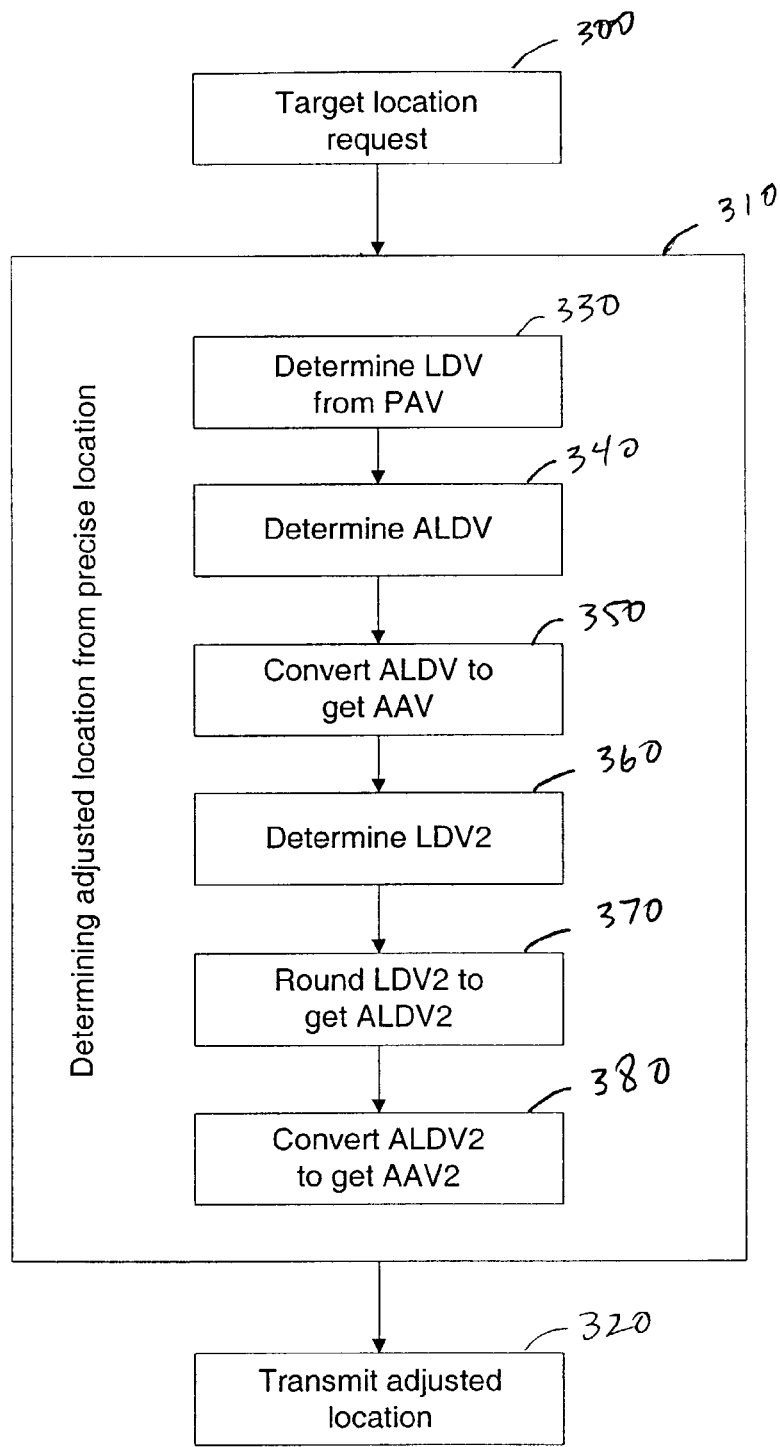
FIG. 3 is a flowchart that generically describes a precision control algorithm and a use for the results of the precision control algorithm.

FIG. 3 is a flow chart that generically describes a precision control algorithm and a use for the results of the precision control algorithm. Infrastructure elements within a wireless communication system, such as, for example, processing elements and memory elements within a base station or base station controller, can be configured to perform the method described in FIG. 3 without undue experimentation. Alternatively, specialized infrastructure elements can be used to perform such a function. In one aspect, the specialized infrastructure element can be a Mobile Position Center (MPC) that is configured to perform the computationally intense calculations for a group of base stations or base station controllers, each base station or base station controller supporting a group of mobile stations. In another aspect, the adjusted position of the target can be derived by the target itself, rather than an infrastructure element.

At step 300, a request for a target location is processed by an infrastructure element. At step 310, the infrastructure element uses a precision control algorithm to determine a diluted-precision, adjusted location of the target. At step 320, the adjusted location of the target is transmitted to the requesting entity.

One precision control algorithm that can be used for this embodiment is included in FIG. 3 and proceeds as follows:
1. At step 330, the measured latitude is first converted from a precise arc value (PAV) to a linear distance value (LDV) from the Equator along the meridian.
2. At step 340, LDV is then rounded with a desired linear precision to determine an adjusted linear distance value (ALDV).
3. At step 350, ALDV is then converted into an adjusted arc value (AAV).
4. At step 360, the measured longitude corresponding to AAV is determined with undiluted precision from the Greenwich reference meridian using a linear distance value (LDV2).
5. At step 370, LDV2 is then rounded with a desired linear precision to determine an adjusted linear distance value (ALDV2).
6. At step 380, ALDV2 is then converted into an adjusted arc value (AAV2).

Using the precision control algorithm described above, the adjusted position (AAV, AAV2) is transmitted to a requesting entity, rather than the precise position (PAV, actual longitude). The precision can be controlled by the target, the precision can be a system-defined parameter, or the precision may be dependent upon the identity of the requesting entity. For example, the desired linear precision can be 5,000 meters, 10,000 meters, 20,000 meters, or any other arbitrary value designated by either the target or the communication system.

The following is a numerical example of the above algorithm for the precise location (North 34 deg 8 min 11 sec, West 121 deg 54 min 39 sec) with a precision of 10,000 meters;

1. Distance from the Equator along a meridian:
   LDV = 3,793,675 meters.
2. Rounded to 10,000 meters:
   ALDV = 3,790,000 meters.
3. Measured latitude at ALDV:
   AAV = North 34 deg 6 min 12 sec.
4. Distance from Greenwich along a parallel at AAV:
   LDV2 = −11,218,371.
5. Rounded to 10,000 meters:
   ALDV2 = −11,220,000 meters.
6. Adjusted arc value:
   AAV2 = West 121 deg 55 min 42 sec.

Hence, the adjusted position with 10,000 meters precision is (North 34 deg 6 min 12 sec, West 121 deg 55 min 42 sec) in this example.

By rounding the precise location with a flexible precision, the embodiment described above allows the transmission of location information to a requesting entity with a degree of precision with which the target is comfortable. Moreover, by using a precision control algorithm such as that presented herein, the rounding operation is irreversible, so that any eavesdroppers en-route on the Internet cannot derive the precise location information from the one disclosed.

As a benefit to the requesting entity, the adjusted position information has full integrity. As long as the requesting entity is aware that the target is willing to disclose its location to a specified degree of precision, the requesting entity may assume that it has not been deceived. Hence, the requesting entity can rely upon the adjusted position information for the purpose for which it is intended. Moreover, since the adjusted position location is supplied as a single value, i.e., no superfluous information is transmitted to camouflage the adjusted location, the map database lookup process is streamlined.

One favorable consequence for a target is that if the requesting entity is aware of the fact that the target's location is not precise, the requesting entity would not attempt to transmit unwanted information, e.g., advertisements, that depend on precise knowledge of location.

It should be noted that in the above embodiment, an adjusted position location is provided to a requesting entity that corresponds to a range of actual location positions. Movement of the target to any point within the coverage area of the adjusted position location would not result in any change in the adjusted position location. For example, movement from point:

(North 34 deg 8 min <u>11</u> sec, West 121 deg 54 min <u>39</u> sec) to a new point:

(North 34 deg 8 min <u>10</u> sec, West 121 deg 54 min <u>38</u> sec) would still result in an adjusted position of:

(North 34 deg 6 min 12 sec, West 121 deg 55 min 42 sec) at the new point.

However, in those instances wherein the target is traveling from the range of one adjusted position to another, there is a possibility that an eavesdropper can derive a narrow range of territory wherein the target could have crossed over from one adjusted position to another. In these instances, implementation of the embodiments can be easily adjusted so that no adjusted positions are transmitted to requesting entities while a target is traveling within the problematic territory. Alternatively, the implementation of the embodiments can easily be adjusted to cover larger overlapping areas, so that the size of an overlapping area is within a user-defined comfort tolerance.

Alternatively, the precision control algorithm can be implemented with a geographic look-up table, wherein the geographic look-up table comprises predefined geographic coverage areas. For example, an infrastructure element would determine the precise geographic location of a target, and then look up a corresponding predefined coverage area in a table. Each predefined coverage area in the table can correspond to a plurality of actual geographic locations. The predefined geographic coverage area is then transmitted to the requesting entity.

The predefined geographic coverage area can also be associated with descriptive information that can be helpful to the target. For example, the descriptive information associated with a predefined geographic coverage area can be a city name, state name, ZIP code, time zone, or other factual information that can be sent to either the target or the requesting entity.

Timing of Reports

In addition to the process of determining adjusted position information, the matter of when to transmit such information to a requesting entity can also be of interest. For example, the adjusted position information should be received by the requesting entity in a timely manner, so that the adjusted position information is not obsolete. However, the reporting of such information should not be excessive due to the possibility of network traffic congestion on either the forward or the reverse links. If the market penetration for position-dependent services is successful, then the load upon the forward link, i.e., raw information reported from a mobile station to infrastructure equipment, and the load upon the reverse link, i.e., position-dependent service information from the requesting entity to the target, can become problematic for regular voice and data traffic.

A simple solution is to configure the mobile station so that the mobile station reports its adjusted position at regular time intervals. This solution is not favored since it may result in excessive position reporting, which occurs when the mobile station has not move at all, or has only moved slightly.

In one embodiment, the MPC or other hardware in the system determines the adjusted position of a mobile station from raw data and reports the adjusted position at regular intervals to a requesting entity via a landline connection.

In another embodiment, the adjusted position information can be transmitted to a requesting entity only when the target has reached a new location that is a predetermined distance away from an old location. The predetermined distance can be any fixed or variable distance value. For example, the predetermined distance value can be a short value if the target is moving within an area A, but the predetermined distance value can be changed to a large value if the target moves into an area B. Within either area A or area B, a report is transmitted only when the target has moved to a new location that is the requisite predetermined distance away from the old location. This distance-based reporting may be used as a way of reporting progress on a target's projected trajectory of travel, without having to poll the target excessively.

In another aspect, a report is made if the target's distance from a waypoint location exceeds a predetermined value. Using this reporting scheme in a navigation assistance application, a deviation from a planned trajectory can be used to prompt re-computation of the planned trajectory and/or be used to prompt an appropriate warning to the target.

In another embodiment, the adjusted position information is reported to a requesting entity if a proximity trigger is activated. In one aspect, a report is made if the target's distance from a waypoint location is less then a predetermined value. Using this reporting scheme in a navigation assistance application, progress along a planned trajectory can be used to prompt the transmission of the next instruction to the target.

In another embodiment, the adjusted position information is reported if the speed of the target exceeds a predetermined speed value or if the speed of the target falls below a predetermined speed value. Reported adjusted position information under these circumstances may be helpful for situations such as speed limit enforcement of teenage drivers on certain roadways or ensuring complete stops at traffic signs.

In another aspect, a timing scheme for reporting position information can use a combination of the above-described criteria, so that a report to a requesting entity is transmitted whenever at least one of the predetermined threshold values from distance reporting, from waypoint reporting, proximity reporting, or speed reporting is crossed. Hence, it should be understood that the above embodiments for controlling the adjusted position information can be implemented independently or in combination with other embodiments within a communication system. For example, if the target is traveling from dense, urban streets to sparse, rural highways, a system could be designed so that a precision control algorithm (as, for example, as described in FIG. 3) is implemented and an adjusted position is transmitted when the target activates a proximity trigger in the urban environment, but a geographic lookup table is implemented and an adjusted position is transmitted when the target travels over predetermined distances on the rural highway.

In another example, the system can be designed so that the reporting scheme is changed according to the load on the system at peak and off-peak hours. During peak loads, the location reports are transmitted at a reduced rate, while during off-peak loads, the location reports are transmitted at a normal or an increased rate. This will greatly reduce the amount of congestion on the forward and reverse links during peak hours, and thus improve the overall system capacity during these hours.

Moreover, although the above embodiments that describe the timing of reports to requesting entities are described as reporting the adjusted position of the target, the timing schemes can be further extended to selectively report the precise position of the target as well, if the target does so choose. Again, it should be noted that the embodiments described herein are for allowing a user of a trackable device to control the degree of precision with which location information is reported. If the user is comfortable with the transmission of precise location information to requesting entities, then the user can set the device to do so, rather than transmitting adjusted location information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. An apparatus comprising:
   a memory element; and
   a processor element operatively enabled to execute a set of instructions stored in the memory element, wherein the set of instructions if executed by the processor element operatively enable the processor element to:
      access location information identifying a measured geographic location of a target, the location information including at least one arc value associated with either a measured longitude or a measured latitude;
      convert the arc value into a corresponding linear value, the linear value being associated with a linear distance;
      determine an adjusted linear value based at least in part on a desired linear precision value and the linear value;
      convert the adjusted linear value into a corresponding adjusted arc value associated with either an adjusted longitude or an adjusted latitude;
      establish adjusted location information of the target based at least in part on the adjusted arc value, wherein the adjusted location information identifies a diluted geographic location of the target; and
      initiate transmission of at least a portion of the adjusted location information to a requesting entity unless the measured geographic location lies within a problematic territory, then refraining from initiating transmission of the adjusted location information to the requesting entity.

2. The apparatus of claim 1 wherein the set of instructions if executed by the processor element operatively enable the processor element to determine the adjusted linear value by rounding the linear value based at least in part on the desired linear precision value.

3. The apparatus of claim 1, wherein the set of instructions if executed by the processor element operatively enable the processor element to determine the adjusted linear value by using a lookup table.

4. The apparatus of claim 1, wherein the adjusted location information is identified by a descriptive tag, wherein the descriptive tag is for transmission to the target or the requesting entity.

5. The apparatus of claim 1, wherein the set of instructions if executed by the processor element operatively enable the processor element to transmit at least the portion of the adjusted location information to the requesting entity based at least in part on a time interval.

6. The apparatus of claim 1, wherein the set of instructions if executed by the processor element operatively enable the processor element to transmit at least the portion of the adjusted location information to the requesting entity based at least in part on a distance interval from a previous location.

7. The apparatus of claim 1, wherein the set of instructions if executed by the processor element operatively enable the processor element to transmit at least the portion of the adjusted location information to the requesting entity based at least in part on a predetermined distance from a waypoint.

8. The apparatus of claim 1, wherein the set of instructions if executed by the processor element operatively enable the processor element to transmit at least the portion of the adjusted location information to the requesting entity based at least in part on a violation of a speed threshold.

9. An apparatus for controlling geographic location information of a target, comprising:
   a memory element; and
   a processor element configured to execute a set of instructions stored in the memory element, the set of instructions for:
      determining a precise location of the target in a first value;
      converting the first value into a second value, wherein the first and second values are selected from a group consisting of arc and linear values, wherein the first value being an arc value and the second value being a linear value, and wherein converting the first value into a second value comprises converting a measured latitude arc value of the precise location into a linear distance;
      approximating the second value into an approximate second value, wherein approximating the second value into an approximate second value comprises rounding the linear distance with a predetermined linear precision to an adjusted linear distance value;

converting the approximate second value into an approximate first value as an approximate location of the target, wherein converting the approximate second value into an approximate first value comprises converting the adjusted linear distance value into an adjusted latitude arc value;

determining a measured longitude linear distance corresponding to the adjusted latitude arc value;

rounding the measured longitude linear distance within a second predetermined linear precision to an adjusted measured longitude linear distance;

converting the adjusted measured longitude linear distance to an adjusted longitude arc value;

determining whether the precise location lies within a problematic territory; and if the precise location lies within a problematic territory, then refraining from transmitting the approximate location of the target to the requesting entity, otherwise transmitting the approximate location of the target to a requesting entity, wherein transmitting the approximate location comprises transmitting the adjusted latitude arc value and the adjusted longitude arc value to the requesting entity.

10. A method for controlling geographic location information of a target, comprising;

using a processor element configured to execute a set of instructions stored in a memory element:

accessing a precise location of the target;

using the precise location to adjust an approximate location of the target, wherein using the precise location to adjust the approximate location comprises:

converting a measured latitude arc value of the precise location into a linear distance;

rounding the linear distance with a predetermined linear precision to an adjusted linear distance value;

converting the adjusted linear distance value into an adjusted latitude arc value;

determining a measured longitude linear distance corresponding to the adjusted latitude arc value;

rounding the measured longitude linear distance within a second predetermined linear precision to an adjusted measured longitude linear distance; and converting the adjusted measured longitude linear distance to an adjusted longitude arc value;

determining whether the precise location lies within a problematic territory; and if the precise location lies within a problematic territory, then refraining from transmitting the approximate location of the target to the requesting entity otherwise transmitting the approximate location of the target to a requesting entity, wherein transmitting the approximate location comprises transmitting the adjusted latitude arc value and the adjusted longitude arc value to the requesting entity.

11. The method of claim 10, further comprising identifying the approximate location of the target by a descriptive tag, wherein the descriptive tag is for transmission to the target or the requesting entity.

12. The method of claim 10, further comprising timing the transmission of the approximate location to the requesting entity according to a time interval.

13. The method of claim 10, further comprising timing the transmission of the approximate location to the requesting entity according to a distance interval from a previous location.

14. The method of claim 10, further comprising timing the transmission of the approximate location to the requesting entity to occur at a predetermined distance from a waypoint.

15. The method of claim 10, further comprising timing the transmission of the approximate location to occur at a violation of a speed threshold.

16. A method for diluting location information of a target device, comprising:

using a processor element configured to execute a set of instructions stored in a memory element:

converting a measured latitude arc value of a target device into a linear distance;

rounding the linear distance based at least in part on a desired linear precision value to establish an adjusted linear distance value;

converting the adjusted linear distance value into an adjusted latitude arc value of the target device, wherein the adjusted latitude arc value establishes at least a portion of a diluted geographic location of the target;

converting a measured longitude arc value of the target device into a second linear distance;

rounding the second linear distance based at least in part on the desired linear precision value to establish an adjusted second linear distance;

converting the adjusted second linear distance to an adjusted longitude arc value of the target device, wherein the adjusted longitude arc value establishes at least another portion of the diluted geographic location of the target; and transmitting the adjusted latitude arc value and the adjusted longitude arc value of the target device to a requesting entity unless both the measured latitude arc value and the measured longitude arc value lie within a problematic territory, then refraining from initiating transmission of the adjusted latitude arc value and the adjusted longitude arc value to the requesting entity.

17. An apparatus for controlling location information of a target comprising:

means for ascertaining a location of the target to establish at least a first arc value associated with either a measured longitude or a measured latitude;

means for converting the first arc value into a corresponding linear value, the linear value being associated with a linear distance;

means for determining an adjusted linear value based at least in part on the linear value and a desired precision value;

means for converting the adjusted linear value into a corresponding adjusted arc value associated with either an adjusted longitude or an adjusted latitude;

means for establishing adjusted location information of the target based at least in part on the adjusted arc value, wherein the adjusted location information identifies a diluted geographic location of the target; and means for transmitting at least a portion of the adjusted location information to a requesting entity unless the location of the target lies within a problematic territory, then refraining from initiating transmission of the adjusted location information to the requesting entity.

* * * * *